Sept. 2, 1941.　　　　　J. H. LINE　　　　　2,254,746
OPTICAL ARTICLE FOR ASSISTING VISION
Filed March 27, 1939
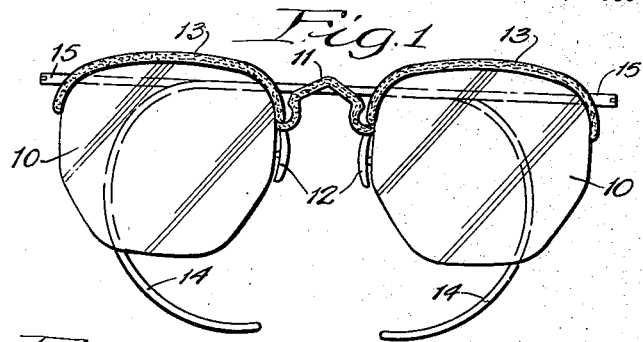
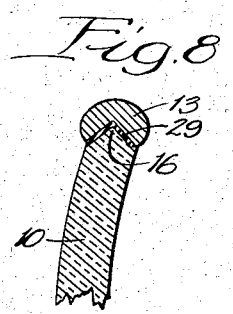
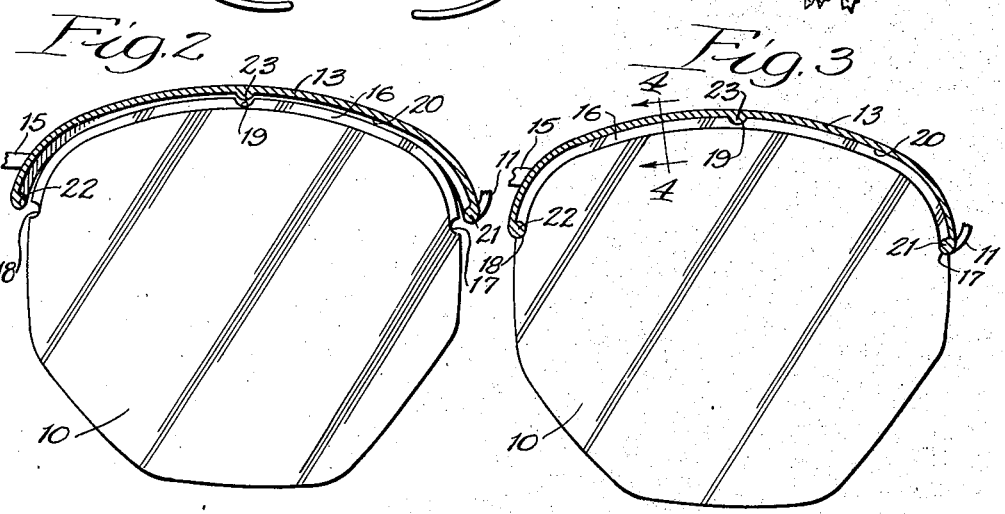
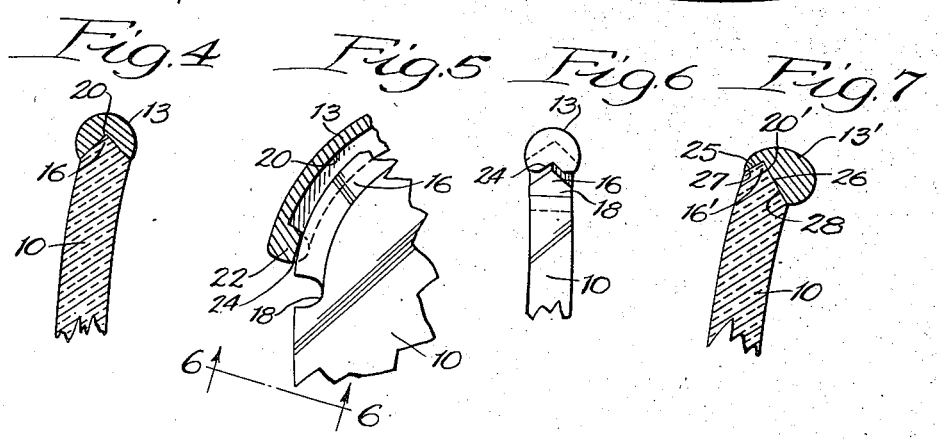
Inventor:
John H. Line,
By Fisher, Clapp, Soans & Pond,
Attorneys.
Witnesses
Wm. E. Dow Patented Sept. 2, 1941

2,254,746

UNITED STATES PATENT OFFICE 2,254,746

OPTICAL ARTICLE FOR ASSISTING VISION

John H. Line, Chicago, Ill.

Application March 27, 1939, Serial No. 264,430

3 Claims. (Cl. 88—47)

This invention relates to the art of optical articles used for assisting vision, and more particularly to instruments commonly known as eye glasses and spectacles.

In the earlier types of eye glasses the frame has been attached to the lenses by small screws passed through holes in the lenses near the edges of the latter, while in the case of spectacles and to some extent eye glasses also, the lenses have been secured in the frame by circular or oval rims of the frame completely encircling and embracing the lenses, and these earlier types are still quite extensively employed. In a later development the complete circular or oval rims have been replaced by partial rims commonly known as "semi" or "quarter" rims, some of which are attached to the lens by screws passed through holes in the lens, while others, to avoid drilling holes through the lens, are attached by lugs or hooks on the ends of the rim members engaged with notches cut in the edge of the lens, the rim members in such cases being made of elastic material capable of limited endwise stretching so as to cause the lugs or hooks to snap into the notches and tightly grip the lens. Frames of this latter type wherein the rim member is channeled to embrace the edge portion of the lens covered thereby to prevent fore and aft displacement of the lens relatively to its holding frame are also known.

My present invention relates to eye glasses and spectacles of this last mentioned type, and the general object of the invention has been to provide a superior article of this character that can be made and assembled at a low cost, will be durable and highly efficient in use, will involve a minimum of structural parts, and will afford a maximum field of vision to the lenses. More specific objects have been to provide a construction facilitating assembling and insuring accurate positioning of the lenses in the semi-rims of the frame with reference to the optical centers of the lenses, to provide a construction whereby the lenses will be held securely in a firm grip by tension pressure of the rim member which may be as much as ten pounds on each lens, to provide a construction wherein this tension pressure will remain constant until the lens is removed, and to provide a construction wherein the attaching means will be invisible from both front and rear, thus conducing to the neat appearance of the article and the satisfaction and comfort of the wearer.

Still other objects and attendant advantages of the invention will be apparent to opticians and others skilled in the art from the following detailed description of a practical embodiment thereof shown in the accompanying drawing, in which—

Fig. 1 is a front elevation of a spectacle form of the invention, showing the bows folded.

Fig. 2 is a front elevation, enlarged, of the left lens and semi-rim of Fig. 1, the rim member being shown in longitudinal section and in stretched condition for application of the lens thereto.

Fig. 3 is a view similar to Fig. 2, but showing the rim and lens in fully assembled position.

Fig. 4 is an enlarged cross-section through through the rim and a portion of the lens, taken on the line 4—4 of Fig. 3.

Figs. 5 and 6 are detail views, illustrating an alternative method of assembling the rim and lens wherein the rim is applied to the lens, instead of vice versa as in Figs. 2 and 3; Fig. 5 being a fragmentary front elevation of the lens with the rim in central longitudinal section, and Fig. 6 being an end elevation viewed on the line 6—6 of Fig. 5.

Fig. 7 is a view similar to Fig. 4, showing a modified form of rim.

Fig. 8 is a view similar to Fig. 4, showing the use of a cushioning strip between the rim and the beveled edge portion of the lens.

Referring to the drawing, 10 designates each of a pair of lenses herein shown as of a popular modern shape or configuration, although the particular shape or configuration of the lens is immaterial to the present invention. The frame, which is broadly of a well known and extensively used type, comprises, a nose bridge 11, nose pads 12, semi-rims 13, and bows 14 hinged to lugs 15 on the outer ends of the semi-rims 13.

The present invention relates to a novel mounting of the lenses in the rim members. In the embodiment of the invention herein illustrated, the upper portion of the edge of each lens 10 is formed with a bevel 16 that is commensurate lengthwise with the semi-rim member 13. At the ends of the bevel 16 are notches,—a notch 17 at the nose end and a similar notch 18 at the temple end. As shown in Figs. 2 and 3, these notches 17 and 18 are half-round and have a depth equal to the height of the bevel 16, and are formed in the extreme ends of the bevel. A substantially central notch 19 is also preferably formed in the bevel 16, and this notch, which I term a lens-centering notch, may be, and preferably is, of somewhat less depth than the height of the bevel.

The semi-rim member 13 is preferably made of spring metal or other spring material, and is bowed to conform to the beveled portion 16 of the lens edge. In the underside of the rim member 13 is a longitudinal V-shaped channel or groove 20 which has the same angularity as the bevel 16 of the lens, and is adapted to snugly fit and just cover the sides of the bevel, when applied, as shown in Fig. 4. Disposed in and crosswise of the ends of the channel 20 are half-round end lugs 21 and 22, the former adapted to cooperate with the notch 17, and the latter with the notch 18; and disposed crosswise of the central portion of the channel is a similar but smaller lug 23 that cooperates with the notch 19 to center the lens relatively to the rim member when applying the lens to the rim member in the following described manner.

The rim member 13 is stretched lengthwise to slightly expand the same, which stretching may be effected by a suitable tool which grips and draws apart the ends to the extent indicated in Fig. 2, whereupon the lens 10 is entered from beneath and the notch 19 is registered with the lug 23, thus insuring the correct position of the focal center of the lens relatively to its supporting rim. The two ends of the rim are then released, whereupon the lugs 21 and 22 enter and fill the notches 17 and 18 under the resilient spring action of the rim, so that the latter takes the form and position shown in Fig. 3, wherein approximately the upper half of the lens is firmly and securely gripped by the rim.

In an alternative manner of assembling the rim and lens, which is illustrated in Figs. 5 and 6, one of the end lugs of the rim, preferably the inner lug 21 is first engaged with its notch 17, with the remainder of the rim slightly spaced from the beveled edge of the lens and the other lug 22 riding on the top edge of the bevel slightly back of the notch 18, as shown in Fig. 5. Pressure is then applied to the rim 13 in the direction of the lens, which causes the lug 22 to ride down on the top edge of the bevel and snap into its notch 18. To facilitate this, the lug 22 is preferably formed with a longitudinal groove or kerf 24 in its face by which it is guided into the notch 18. When employing this method of assembly, the intermediate lens centering notch 19 and lug 23 are not essential; but they are preferably employed, since the first described mode of assembly is the more practical and involves less danger of accidental bending or distortion of the rim member when applying it.

In Fig. 7 I have illustrated a modified cross section of rim member 13' and its channel cooperating with a correspondingly modified form of bevel 16' on the lens. The channel is formed with a relatively narrow front wall 25 and a relatively deep rear wall 26, and the bevel, to fit this channel, is formed with a relatively narrow front side 27 and a relatively wide rear side 28. By this a narrower rim effect is obtained on the front of the rim without any sacrifice of strength and with an improvement in appearance of the rim and lens at the front.

In Fig. 8 I have illustrated a further improvement in the nature of a safety feature, which consists in interposing between the engaging surfaces of the rim member and bevel of the lens a thin cushioning strip 29 of rubber or a rubber composition. With this construction, if the spectacles or eye glasses fall, and the shock of the fall is transmitted through the rim or rim members 13 or any other part of the frame, the effect of the shock on the lens is greatly diminished.

From the foregoing it will be seen that the above described lens mounting not only avoids the use of fastening screws and the like, but it leaves the entire field of the lens clear of any obstruction to the vision of the user therethrough. The construction makes practical the use of rim members of substantial strength and tensional capacity, so that the lenses are very securely held and are properly centered for accurate vision. Also the work of assembling by either of the alternative methods described is so simple that it may be very easily and quickly performed.

The use of half-round notches in the lens and half-round lugs in the rim member fitting and filling said notches is important and advantageous, because the ball-and-socket character of such a connection automatically takes care of any slight variations in the spacing of either the notches or the lugs, since the lugs can rock to a perfect fit in the notches.

Detailed changes in the structure and arrangement of the parts may be resorted to within the scope and coverage of the claims.

I claim:

1. In an article of the class described, the combination with a lens having a beveled edge portion, half-round notches in the ends of said beveled edge portion, and a central lens centering notch in said beveled edge portion, of an endwise stretchable spring lens-gripping rim member co-extensive with said beveled portion and having a longitudinal channel shaped to fit and cover said beveled portion, said rim member having half-round internal lugs disposed crosswise of the ends of said channel and shaped to snap into and fill said notches in a stretched and tensioned condition of said rim member, and a central lug adapted to register with said central notch of the lens to center the latter when applying the lens to the rim.

2. In an article of the class described, the combination with a lens having a beveled edge portion, notches in the ends of said beveled portion, and a central lens-centering notch in said beveled portion, of an endwise stretchable spring lens-gripping rim member co-extensive with said beveled portion and having a longitudinal channel shaped to fit and of such a depth as to just cover said beveled portion, said rim member having internal lugs disposed crosswise of the ends of said channel and shaped to snap into and fill said notches in a stretched and tensioned condition of said rim member, and a central lug adapted to register with said central notch of the lens to center the latter when applying the lens to the rim; the end notches being of a depth substantially equal to the height of the bevel and the central notch being of a depth less than the height of the bevel, and the end lugs being of a depth substantially equal to the depth of the channel, and the central lug being of a depth less than the depth of the channel.

3. In an article of the class described, the combination of an endwise stretchable spring lens-gripping rim member having a longitudinal channel formed with a relatively narrow front wall and a relatively deep rear wall both extending from a meeting point in said rim member to the circumference of the latter, said rim member having half-round internal lugs disposed crosswise of the ends of said channel, and a lens having a beveled top edge portion having a correspondingly narrowed front side and a correspondingly widened rear side fitting and coextensive with said front and rear walls of the channel of said rim member, said beveled top edge portion having half-round notches in its ends into which said half-round internal lugs are adapted to snap, filling said notches, in a stretched and tensioned condition of said rim member.

JOHN H. LINE.